United States Patent [19]

Shust

[11] Patent Number: 4,924,720

[45] Date of Patent: May 15, 1990

[54] DRIVE REVERSER AND CLUTCH SELECTOR MECHANISM

[75] Inventor: Ryan E. Shust, Winnipeg, Canada

[73] Assignee: Ford New Holland, Inc., New Holland, Pa.

[21] Appl. No.: 417,398

[22] Filed: Oct. 5, 1989

[51] Int. Cl.$^5$ .............................................. F16H 3/08
[52] U.S. Cl. ...................................... 74/377; 74/15.86
[58] Field of Search .................. 74/15.6, 15.63, 15.66, 74/15.82, 15.86, 377, 376

[56] References Cited

U.S. PATENT DOCUMENTS

| | | | |
|---|---|---|---|
| 2,344,046 | 3/1944 | Le Tourneau | 74/377 |
| 2,464,538 | 3/1949 | Vanderzee | 74/377 |
| 2,872,003 | 2/1959 | Nussbaumer | 74/377 |
| 2,999,397 | 9/1961 | Walter | 74/377 |
| 3,004,438 | 10/1961 | Funk et al. | 74/15.63 |
| 3,006,209 | 10/1961 | Stromberg | 74/377 |
| 3,071,021 | 1/1963 | Miller | 74/377 |
| 3,084,564 | 4/1963 | Miller | 74/377 |
| 3,422,693 | 1/1969 | Vaiden | 74/377 |
| 4,215,586 | 8/1980 | Morris, Sr. | 74/15.66 |

FOREIGN PATENT DOCUMENTS

| | | | |
|---|---|---|---|
| 1031601 | 9/1953 | Fed. Rep. of Germany | 74/377 |
| 60-30860 | 2/1985 | Japan | 74/377 |
| 761560 | 11/1956 | United Kingdom | 74/377 |
| 824186 | 11/1959 | United Kingdom | 74/15.86 |
| 922159 | 3/1963 | United Kingdom | 74/15.86 |

Primary Examiner—Dwight Diehl
Attorney, Agent, or Firm—Larry W. Miller; Frank A. Seemar; Darrell F. Marquette

[57] ABSTRACT

A transmission particularly adapted for use on a Bidirectional TM tractor, is disclosed wherein the engine of the tractor drives an input shaft having first and second spline-mounted drive gears. An idler gear is connected to a power take-off output shaft and is driven by the second drive gear. The idler gear drives a first driven gear connected to a clutch mounted on an output shaft. The first drive gear drives a second driven gear connected to the clutch. The first and second driven gears rotate in opposite directions of rotation. The clutch is keyed to the transmission output shaft and is operable to select the direction of rotation by engagement of either the first or second driven gears.

5 Claims, 2 Drawing Sheets

DRIVE REVERSER AND CLUTCH SELECTOR MECHANISM

BACKGROUND OF THE INVENTION

This invention relates, generally, to a drive reverser and power take-off assembly and, more particularly, to a drive reverser and power take-off assembly for use on a bi-directional tractor.

Bidirectional TM tractors are tractors that are designed or adapted to work with implements mounted on either the front end or the back end or on both simultaneously. In such tractors, the operator may face in either direction to operate the tractor and attached implements. Previously, hydrostatic transmissions have been used to allow forward and reverse operating capabilities because of their convenience, ease in offering bi-directional advantage, and infinite speed selection under operating conditions. Mechanical transmissions, however, are more efficient than hydrostatic transmissions.

SUMMARY OF THE INVENTION

According to the present invention, there is disclosed a drive reverser comprising an input shaft, first and second drive gears mounted on said input shaft, an idler gear driven by said second drive gear, a first driven gear driven by said first drive gear, a second driven gear driven by said idler gear in a sense opposite to the direction of said first driven gear, and a clutch means mounted on an output shaft and operable to select either of said first or second drive gears and to drive said output shaft.

It is an object of this invention to provide a mechanical transmission for a tractor wherein the power take-off shaft is powered from an idler gear in the transmission rather than from a drive gear.

These and other objects of this invention will be accomplished according to the instant invention by providing a transmission wherein the engine of the tractor drives an input shaft having first and second spline-mounted drive gears. An idler gear is connected to a power take-off output shaft and is driven by the second drive gear. The idler gear drives a first driven gear connected to a clutch mounted on an output shaft. The first drive gear drives a second driven gear connected to the clutch. The first and second driven gears rotate in opposite directions of rotation. The clutch is keyed to the transmission output shaft and is operable to select the direction of rotation by engagement of either the first or second driven gears.

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE PREFERRED EMBODIMENT

Figure 1:
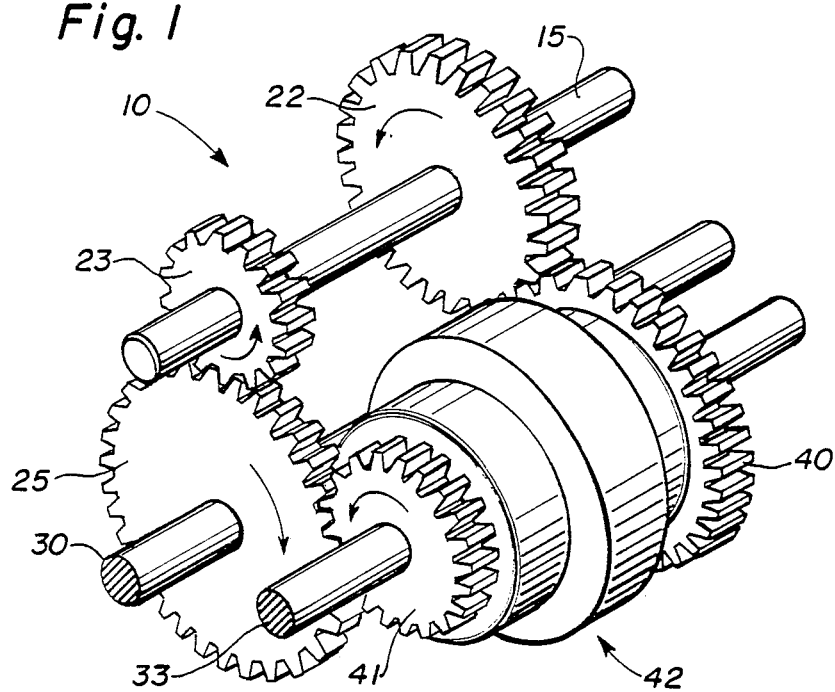
FIG. 1 is an isometric view of the drive reverser incorporating the principles of the instant invention.
Figure 2:
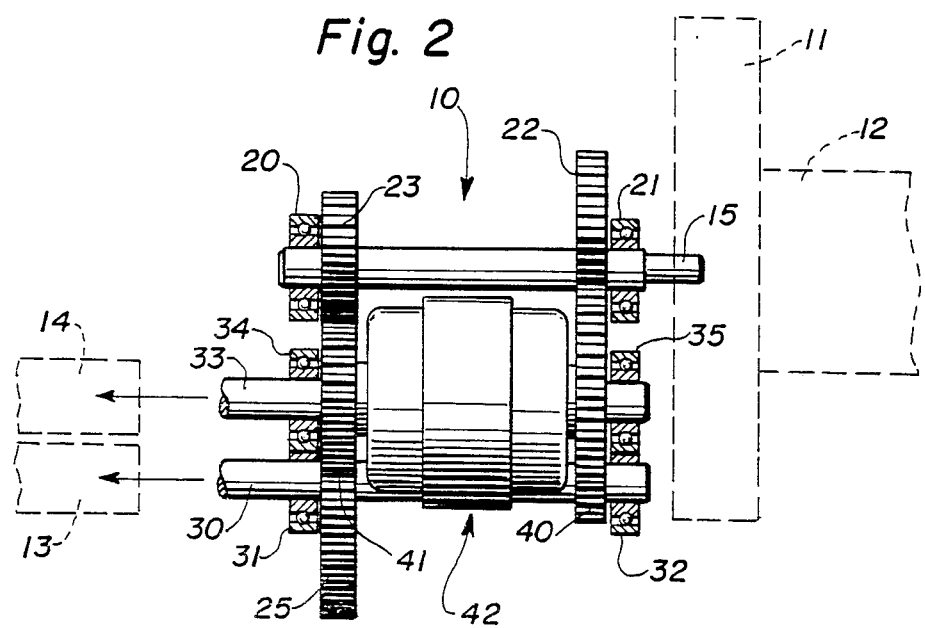
FIG. 2 is a side view of the drive reverser shown in FIG. 1.
Figure 3:
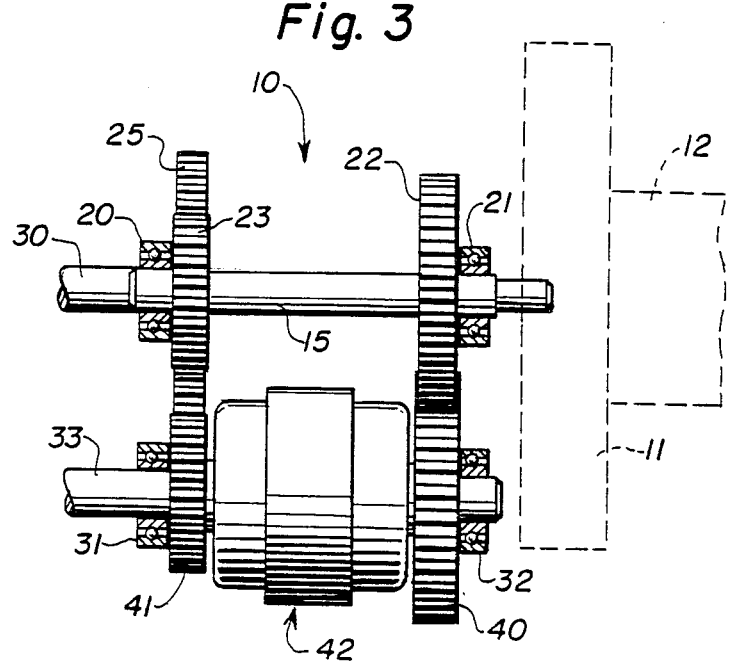
FIG. 3 is a plan view of the drive reverser shown in FIG. 1.

Referring now to the drawings, a drive reverser is shown generally at 10 in FIGS. 1 and 2. The drive reverser 10 transmits power from the flywheel 11 of the engine 12 to a power take-off unit generally shown at 13 and the transmission generally shown at 14 which provides power to the tractor (not shown).

An input shaft 15 is connected to flywheel 11. The input shaft 15 is journalled in roller bearings 20, 21 mounted at each end of input shaft 15 in respective bores in the drive reverser housing (not shown). First and second drive gears 22, 23 respectively, are mounted on the input shaft 15 and rotate therewith. The second drive gear 23 is drivingly engaged with the idler gear 25 which is mounted on power take-off output shaft 30. The power take-off output shaft 30 is journalled by roller bearings 31, 32 mounted in respective bores of the drive reverser housing (not shown).

A transmission output shaft 33 delivers rotational power to the transmission 14 and is journalled in roller bearings 34, 35. First and second driven gears 40, 41 respectively, are rotatably mounted on the output shaft 33 and rotate freely thereon. A clutch generally shown at 42 is mounted on the output shaft 33 and is connected thereto by a splined connection (not shown). The first driven gear 40 is driven by the first drive gear 22, while the second driven gear 41 is driven by the idler gear 25 in an opposite direction to that of the first driven gear 40.

Figure 4:
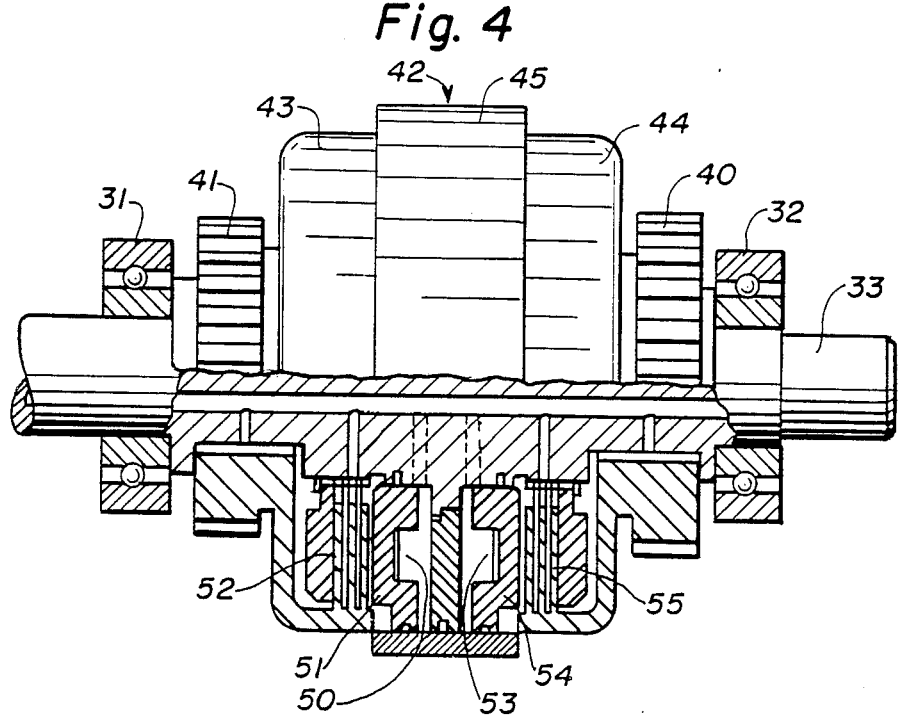
FIG. 4 is a side and partial cutaway view of the clutch assembly.

Referring now to FIG. 4, the main clutch assembly is shown generally at 42. The clutch assembly 42 comprises a forward set of friction plates 43, a reverse set of friction plates 44, and a clutch pack 45. To initiate forward motion, hydraulic oil is fed through the center of the output shaft 33 and, by the use of valves (not shown), is directed into the cavity 50. The piston 51 is moved under the pressure of the hydraulic oil in the cavity 50 leftwardly to make contact with the rotating clutch discs 52. The rotational motion of the second driven gear 41 is transmitted from the clutch discs 52 to the piston 51 and, thence, to the output shaft 33.

To initiate reverse motion, hydraulic oil is fed through the center of output shaft 33 and, by the use of valves (not shown), the oil is directed to the cavity 53. The piston 54 is moved rightwardly under the pressure of the hydraulic oil in the cavity 53 to make contact with the rotating clutch discs 55. The rotational motion of the first driven gear 40 is transmitted from the clutch discs 55 to the piston 54 and, thence, the output shaft 33.

In operation, the flywheel 11 of the engine 12 powers the first input shaft 15 which rotates both the first and second drive gears 22, 23, respectively. The first drive gear 22 is engaged with the first driven gear 40 on the output shaft 33, while the second drive gear 23 is operatively engaged with the idler gear 25. The idler gear 25, in turn, is drivingly engaged with the second driven gear 41 in a rotational direction opposite to that of the first driven gear 40. The first and second driven gears 40, 41 are connected to the rotating clutch discs 52, 55, respectively, in the main clutch assembly 42 which rotate freely on the shaft 33 within the clutch assembly 42.

The main clutch assembly 42 includes a clutch pack 45 keyed directly to the output shaft 33. The clutch pack 45 is normally in the neutral position and the operator, to initiate desired vehicle motion, will move a selector connected to the clutch assembly 42 to determine which one of first and second driven gears 40, 41, the clutch pack 45 will engage. The selective introduction of hydraulic oil into the clutch pack 45 effects movement of one of two pistons 51, 54 into engagement with corresponding clutch discs 52, 55, respectively, to cause a transfer of rotational power from the selected drive gear 40, 41 to drive the output shaft 33 which, in turn, provides the transmission 14 with the necessary rotation in the selected forward or reverse direction.

The embodiment described is illustrative of the invention only and is not to be considered limiting as there are many modifications which can be made without departing from the scope of the invention as defined in the accompanying claims.

Having thus described the invention, what is claimed is:

1. A drive reverser comprising an input shaft, first and second drive gears mounted on said input shaft, an idler gear driven by said second drive gear, a power take-off output shaft driven by said idler gear, a first driven gear driven by said first drive gear, a second driven gear driven by said idler gear in a rotational direction opposite to the direction of rotation of said first driven gear, and a clutch means mounted on an output shaft and operable to select one of said first and second driven gears, thereby transferring rotational power from said input shaft to said output shaft.

2. A drive reverser as in claim 1 wherein said input shaft is driven by a source of power.

3. A drive reverser as in claim 2 wherein said idler gear is mounted on said power take-off shaft.

4. A drive reverser as in claim 3 wherein said first and second driven gears and said clutch means are coaxially mounted on said output shaft.

5. A drive reverser comprising an input shaft, first and second drive gears mounted on said input shaft, an idler gear driven by said second drive gear and mounted on a power take-off output shaft, a first driven gear operably driven by said first drive gear, a second driven gear operably driven by said idler gear in a sense opposite to the direction of rotation of said first driven gear and a clutch means operable to select either of said first and second driven gears and to drive an output shaft, said first and second driven gears and said clutch means being coaxially mounted on said output shaft.

* * * * *